(12) United States Patent
Pollack

(10) Patent No.: US 11,076,105 B2
(45) Date of Patent: Jul. 27, 2021

(54) MASKING CAMERA FLASH USING REFLECTANCE

(71) Applicant: Siemens Healthcare Diagnostics Inc., Tarrytown, NY (US)

(72) Inventor: Benjamin S. Pollack, Jersey City, NJ (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 77 days.

(21) Appl. No.: 16/319,290

(22) PCT Filed: Jul. 19, 2017

(86) PCT No.: PCT/US2017/042934
§ 371 (c)(1),
(2) Date: Jan. 18, 2019

(87) PCT Pub. No.: WO2018/017764
PCT Pub. Date: Jan. 25, 2018

(65) Prior Publication Data
US 2019/0230272 A1    Jul. 25, 2019

Related U.S. Application Data

(60) Provisional application No. 62/365,295, filed on Jul. 21, 2016.

(51) Int. Cl.
*H04N 5/235* (2006.01)
*G01N 35/04* (2006.01)
(Continued)

(52) U.S. Cl.
CPC ............ *H04N 5/2354* (2013.01); *G01N 35/04* (2013.01); *H04N 5/232* (2013.01); *H04N 5/235* (2013.01);
(Continued)

(58) Field of Classification Search
CPC ...... H04N 5/232; H04N 5/235; H04N 5/2354; G01N 2035/00306; G01N 2035/0498; G01N 35/04
See application file for complete search history.

(56) References Cited

U.S. PATENT DOCUMENTS 5,572,319 A * 11/1996 Blackman .......... G01N 21/8803
250/485.1
2004/0141320 A1 * 7/2004 Bock ...................... G01N 21/87
362/253
(Continued)

FOREIGN PATENT DOCUMENTS

| CN | 101137014 A | 3/2008 |
|---|---|---|
| CN | 101571999 A | 11/2009 |

(Continued)

OTHER PUBLICATIONS

PCT International Search Report and Written Opinion dated Oct. 3, 2017 (7 Pages).
(Continued)

*Primary Examiner* — Lin Ye
*Assistant Examiner* — Chriss S Yoder, III

(57) ABSTRACT

One embodiment provides systems and methods for masking the effects of a flash on an operator including: a drawer system configured to receive a tray comprising one or more laboratory containers, wherein upon receiving the tray, the drawer system centers the tray underneath an image capture device; a flash device configured to activate, based on said centering, to illuminate the one or more laboratory containers; and an image capture device configured to capture an illuminated image of the one or more laboratory containers.

17 Claims, 7 Drawing Sheets

(51) Int. Cl.
*H04N 5/232* (2006.01)
*G01N 35/00* (2006.01)

(52) U.S. Cl.
CPC .......... *G01N 2035/00306* (2013.01); *G01N 2035/0498* (2013.01)

(56) References Cited

U.S. PATENT DOCUMENTS

| | | | |
|---|---|---|---|
| 2005/0142033 A1* | 6/2005 | Glezer | G01N 21/66 422/400 |
| 2008/0110115 A1 | 5/2008 | French | |
| 2008/0204883 A1 | 8/2008 | Fong | |
| 2009/0160944 A1 | 6/2009 | Trevelyan et al. | |
| 2015/0350511 A1 | 12/2015 | Kaikumaa | |
| 2016/0025757 A1* | 1/2016 | Pollack | G01N 35/00 348/143 |
| 2016/0138857 A1 | 5/2016 | Klingshirn | |
| 2017/0173195 A1* | 6/2017 | Stibich | A61L 2/10 |

FOREIGN PATENT DOCUMENTS

| | | |
|---|---|---|
| CN | 103091843 A | 5/2013 |
| CN | 103399995 A | 11/2013 |
| CN | 203350585 U | 12/2013 |
| JP | 2006-067100 A | 3/2006 |
| JP | 2007-508745 A | 4/2007 |
| JP | 2012-103176 A | 5/2012 |
| JP | 2013-007949 A | 1/2013 |
| WO | 2005/038705 A2 | 4/2005 |
| WO | 2014/152329 A1 | 9/2014 |
| WO | WO-2014152329 A1 * | 9/2014 ............. G01N 35/00 |

OTHER PUBLICATIONS

Extended EP Search Report dated Jul. 19, 2019 of corresponding European Application No. 17831830.9, 4 Pages.

* cited by examiner

MASKING CAMERA FLASH USING REFLECTANCE

CROSS-REFERENCE TO RELATED APPLICATIONS

This application claims the benefit of U.S. Provisional Application Ser. No. 62/365,295 filed Jul. 21, 2016, which is incorporated herein by reference in its entirety.

TECHNOLOGY FIELD

The present invention relates generally to a camera system for a drawer vision system (DVS).

BACKGROUND

Clinical testing is a precise and accurate process. Thus, many safety and performance checks are required at various stages of the testing to ensure it is being carried out in the proper manner. Not only does the process need to be evaluated, but also potentially recorded. Thus, process control managers (PCM) may be placed at one or more locations throughout a testing process to record and verify testing progress.

PCM(s) in clinical testing environments may involve a drawer or tray system. The drawer system is typically operated by a human (e.g., an operator) that loads trays or groups of testing objects into the drawer system. Once the drawer is in the PCM, an internal integrated camera may take a picture of the experimental components to be used as a reference point. Because accurate pictographic history is required, a flash is typically used to capture the image. However, as one might guess, repeated exposure to a bright flash, or sequence of flashes can have a negative effect on an operator. For example, a migraine or seizure may result from repeated exposure to bright sequences of light.

Thus, there is a need for an improved and less obtrusive method of image capture involving a flash requirement.

SUMMARY

Embodiments are directed to masking a flash associated with an image capture device.

Accordingly, an embodiment provides a method for masking the effects of a flash on an operator comprising: receiving, at a drawer system, a tray comprising one or more laboratory containers; centering the tray underneath an image capture device; activating, based on said centering, a flash device to illuminate the one or more laboratory containers; and capturing, using the image capture device, an illuminated image of the one or more laboratory containers.

A further embodiment provides an information handling device for masking the effects of a flash on an operator comprising: a processor; a memory device that stores instructions executable by the processor to: receive, at a drawer system, a tray comprising one or more laboratory containers; center, using the drawer system, the tray underneath an image capture device; activate, based on said centering, a flash device to illuminate the one or more laboratory containers; and capture, using the image capture device, an illuminated image of the one or more laboratory containers.

Another embodiment provides a system for masking the effects of a flash on an operator comprising: a drawer system configured to receive a tray comprising one or more laboratory containers, wherein upon receiving the tray, the drawer system centers the tray underneath an image capture device; a flash device configured to activate, based on said centering, to illuminate the one or more laboratory containers; and an image capture device configured to capture an illuminated image of the one or more laboratory containers.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Embodiments herein are directed to systems and methods for masking a camera flash using changes in a target's object reflectance and/or timing adjustments. Advantageously, the updated flash operation not only reduces the negative effects but enhances some aspects of the operator experience as discussed herein.

Figure 1:
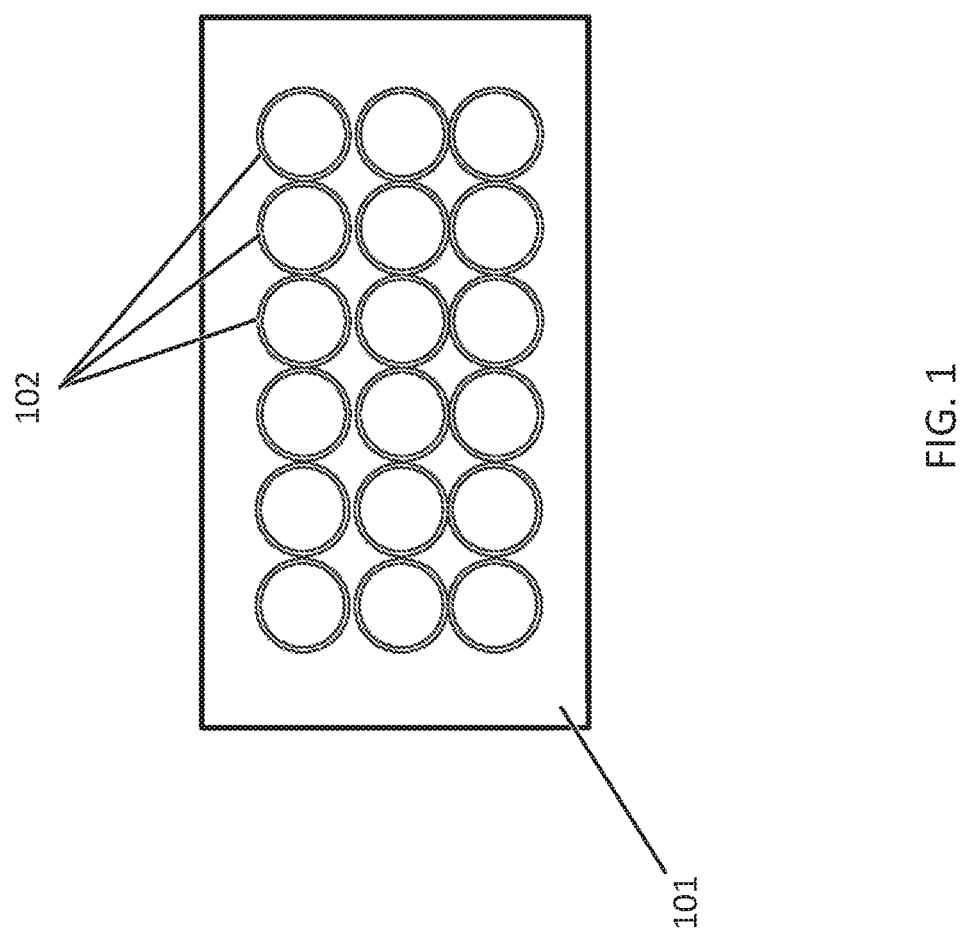
FIG. 1 depicts a top view of plurality of sample test tubes in a PCM drawer.

Embodiments discussed herein relate generally to a drawer vision system (DVS) for a process control manager (PCM) used in clinical testing. The PCM DVS may be a modular subsystem, with a fully independent set of electronics for each drawer. It may also use an image sensor or image capture device with a global shutter and short exposure time (e.g., 100 µs, 105 µs, 110 µs, 115 µs, etc.), to capture images, such as that represented in FIG. 1. Referring to FIG. 1, a tray 101 holding at least one test tube 102, and more likely multiple test tubes 102, is shown. The tray 101 or trays, are housed in a drawer. By opening and closing the drawer as needed, an operator can introduce or remove test tubes as needed. To minimize exposure, the operator quickly closes the drawer (e.g. at speeds below 1.0 m/s). This activity initiates one or more image capture cycles. Because of the short exposure time, an embodiment may require the use of an extremely bright flash (e.g., 200 times brighter than typical ambient laboratory light conditions).

Because the operator may move the drawer in an unpredictable manner (e.g., pulling it only partially out to add and/or remove test tubes, leaving it partially open for an extended period of time, moving it back and forth, etc.), the DVS must activate the flash repeatedly over a short period of time to facilitate image capture. This repeated flashing allows for the system to properly capture an image of the entire drawer. However, because the drawer is under operator control, the flash cannot be triggered at a fixed high frequency, which would mask the flash due to the human eye's flicker fusion response (60 Hz light looks continuous), without using very expensive high-frame-rate cameras and computationally intensive video processing techniques.

Thus, triggering the flash at an extremely high rate of speed could overcome this difficulty. Additionally, it has the potential to mask the flash due to the human eye's flicker fusion response (i.e., 60 Hz light looks continuous). However, it would require the use of very expensive high-frame-rate camera (i.e., image capture device) and computationally intensive video processing techniques in order to detect the flashes of light at very high speeds (e.g., 45-80 Hz).

However, because the drawer is under operator control, simply triggering the flash at a fixed high frequency may not address the problem as a user's movement pattern may be unpredictable. Potential solutions to the above problem may include one of the following: (1) using a single flash to image the target; (2) triggering the flash at a fixed high frequency; and (3) enclosing the camera/target to shield the operator from the flash.

In one embodiment, the average operator drawer closure speed may be between about 0.25 m/s and about 0.35 m/s (e.g., 0.31 m/s as determined by the study discussed herein), which would result in a flash frequency of between about 10 Hz and about 20 Hz (e.g., 13 Hz as determined by the study discussed herein). It is important to note that this is a frequency range wherein human beings are the most sensitive to light flicker. In fact, noticeable flickering at this frequency may cause migraine headaches and even trigger epileptic seizures. In other fields, a constant high-intensity light could be used to bridge the multiple exposure periods, thus eliminating the need to create distinct flash pulses. However, in some embodiments imaging test tubes that contain blood with photosensitive elements (e.g., bilirubin) may be troublesome. Exposing photosensitive blood samples to excess light can alter or damage the clinical results. Accordingly, as discussed herein, some embodiments provide a technique to create a new flash mitigation approach for light sensitive applications using a flash masking system.

Figure 2:
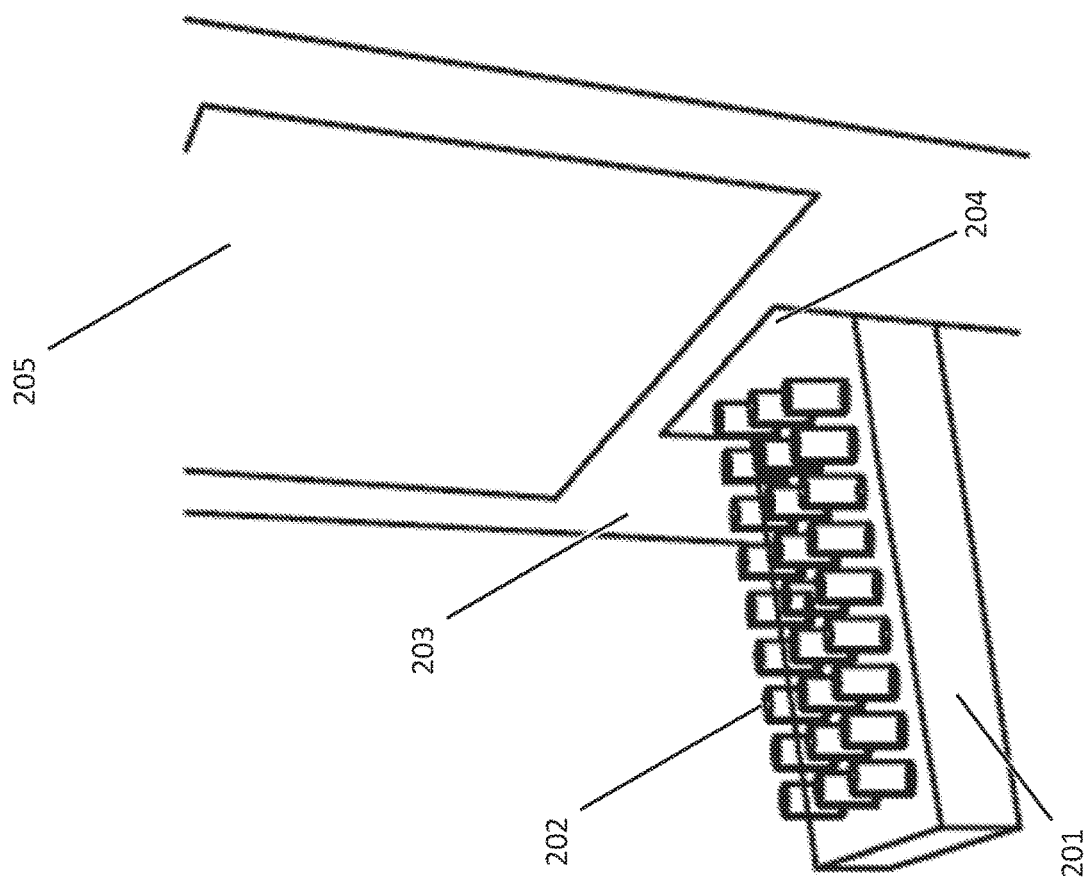
FIG. 2 depicts an illustrative drawer system.

In one embodiment, a combination of techniques may be used to illuminate the target for image capture. For example, an embodiment may minimize light exposure to the retinal area (i.e., the part that perceives the flashing light). This may be done, as shown in FIG. 2, by shielding particular lines of sight from the operator's line of sight using covers. By way of non-limiting example and as shown in FIG. 2, a plurality of test tubes 202, as discussed herein may be placed in a drawer system 201. The drawer system is movably fixed to the imaging system 203 which has a recess 204 into which the tray 201 of test tubes 202 may be inserted. As discussed herein, mitigating the flash of the imaging system 203 may be performed using various techniques. For example, and as shown, an embodiment my utilized a tinted or reflective viewing window 205. This reduces the effect of the flash frequency on the operator. Thus, an embodiment may utilize one or more reflective surfaces (e.g., mirrors), tinted, opaque, etc. to shield the operator while also still allowing them an observational ability. Additionally or alternatively, another embodiment may utilize covers to limit the visible area where light is being reflected.

A further embodiment may attempt to minimize the absolute brightness of the flashing light. For example, in one embodiment, all visible surfaces which could reflect the flash light may be covered or painted with a non-reflective matte style finish (e.g., black matte).

Another embodiment may minimize the perceived contrast of the flashing light to any local ambient/background light. For example, in one embodiment, the flash illumination source may produce a low-intensity background light whenever a drawer on the DVS system is being closed. Typically, as discussed herein, in order to prevent blood analysis damage, (e.g., regarding bilirubin), background illumination may generally be limited to approximately 2.5% of the intensity of the flash pulse. Thus, due to the duration and exposure of the blood to the background light (e.g., the background light may be between about 300 times longer and 900 times longer than the flash pulse), the backlight exposes the blood to a much larger amount of light energy (e.g., between about 15 and about 20 times as much light energy) even with the 2.5% intensity limit. In an additional embodiment, a further innovation may be used wherein the flashes are synchronized to specific events that the operator expects to cause optical disturbances.

In some embodiments, one or more sample handler trays may be designed to align the center of each row of test tubes with the center of a drawer row. In a specific non-limiting embodiment, a drawer encoder system may be used to only trigger the cameras and/or flash when a new drawer row is initially centered under the cameras. Generally, the operator expects a light to reflect off of each row of test tubes differently and expects the light to appear brighter when the test tubes/slot springs are centered under the light versus when the matte black tray is centered under the light. This allows the operator to perceive the already heavily mitigated flashes as variations in reflectance of a constant light source off of a moving tray with varied objects/surfaces.

Figure 3:
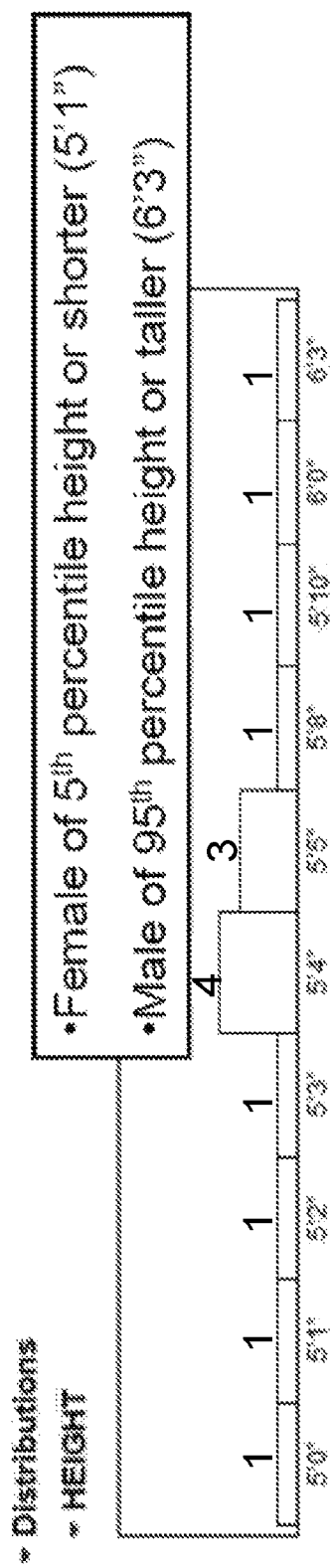
FIG. 3 depicts a graphical illustration of a sample group test subject operators.

All of the embodiments discussed herein may help minimize the perceived or actual brightness of a flash within a DVS system. It should be noted that although they are discussed as separate embodiments, these solutions may be combined with any/all other embodiments proposed herein. A study was conducted to test the effectiveness of various multi-facetted flash-mitigation approach using varied operator subjects. The operators sampled were both male and female, and had heights ranging from 5'0" to 6'3" shown in FIG. 3. The operators were asked to perform two tasks: (1) open and close the drawer at a comfortable speed; and (2) open and close the drawer at the fastest speed you would in a laboratory setting. If the operator noticed the flashing lights of the strobe, a record was made that the operator noticed the flashing lights, and whether the operator found the lights to be acceptable or unacceptable. When the operator noticed the flashing lights, the background light was set to a low level and the test was repeated. The test was repeated until the user found the light intensity to be acceptable or the light level had been set to its maximum capacity (whichever came first). The results are presented herein.

Figure 4:
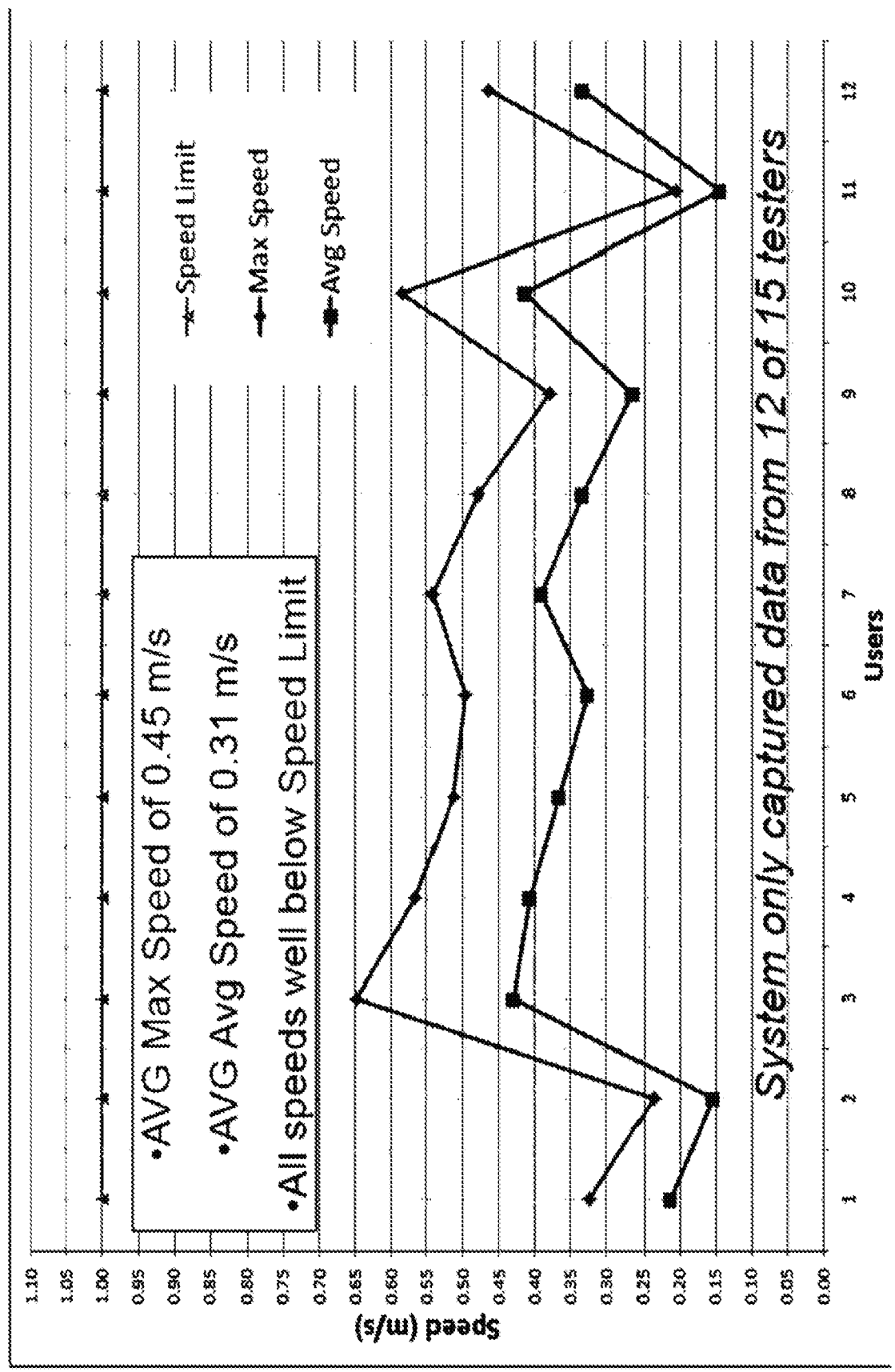
FIG. 4 depicts a graphical illustration of the comfortable drawer operation speed across various users.
Figure 5:
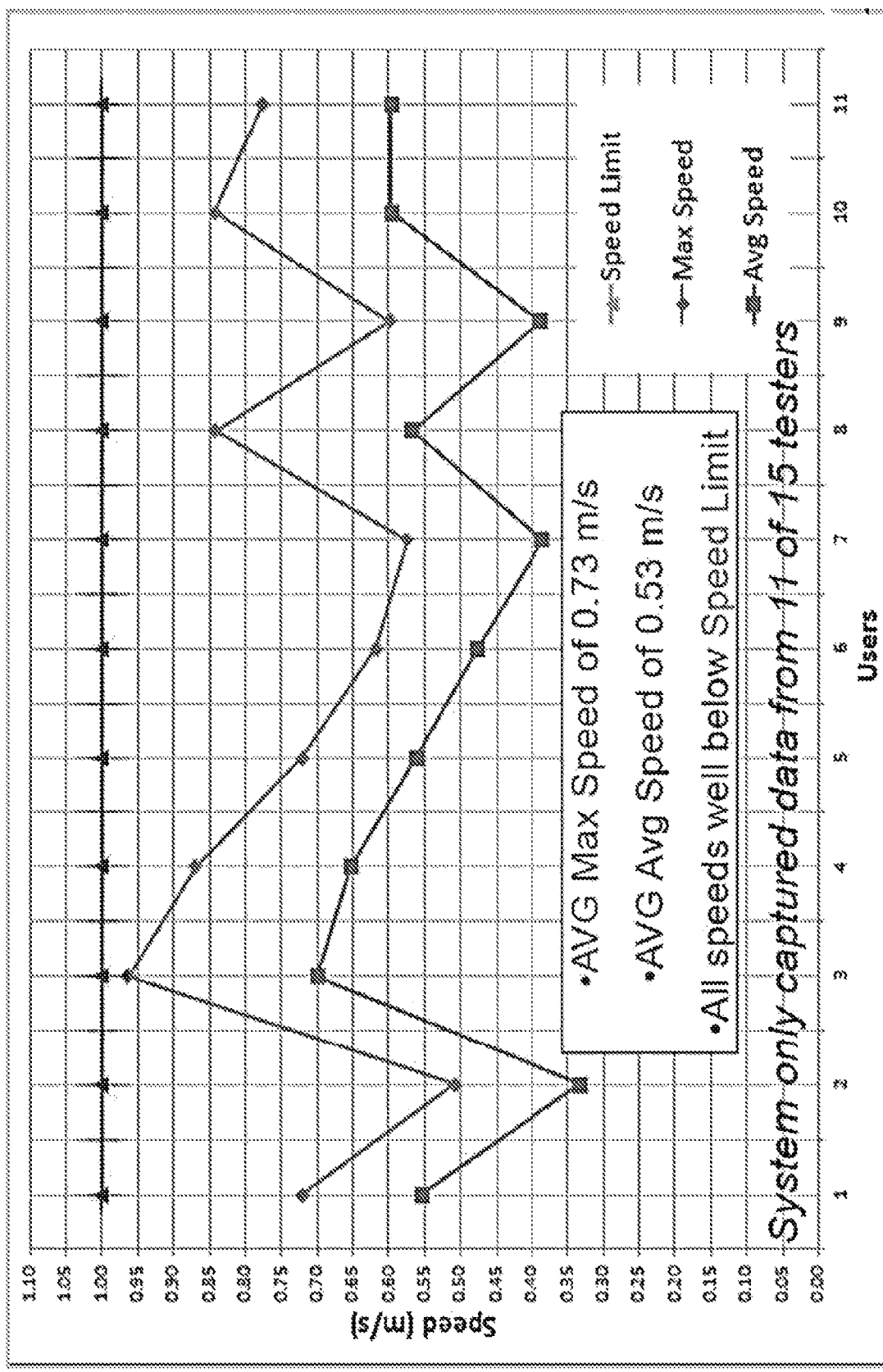
FIG. 5 depicts a graphical illustration of the fastest drawer operation speed across various users.

Referring to FIGS. 4 and 5, a graphical representation of the drawer velocity during the comfortable speed and fastest speed is shown respectively. The data used to create the graph of FIG. 4 relates to the test during which the operators opened and closed the drawer at a comfortable speed. As shown in FIG. 4, the average maximum drawer speed was 0.45 m/s and the overall average speed was 0.31 m/s. Moreover, as shown by the speed limit delineator in FIG. 4, these measured speeds are well below the maximum speed threshold of the system (i.e., 1.0 m/s).

The data used to create the graph of FIG. 5 relates to the test during which the operators opened and closed the drawer at the fastest speed appropriate for a laboratory setting. As shown in FIG. 5, the average maximum drawer speed was 0.73 m/s and the overall average speed was 0.53 m/s. Moreover, as shown by the speed limit delineator in FIG. 5, these measured speeds are still below the maximum speed threshold of the system (i.e., 1.0 m/s).

Figure 6:
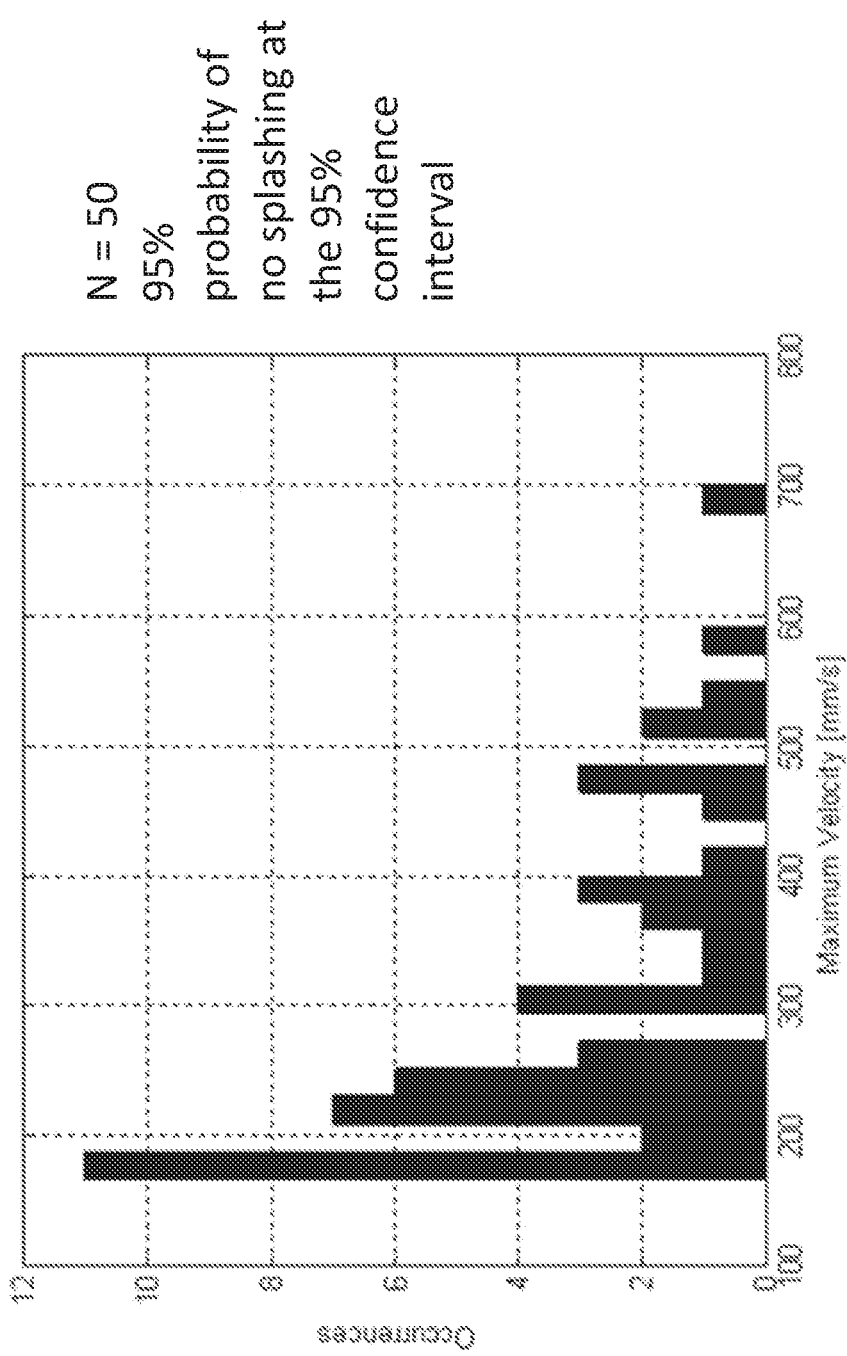
FIG. 6 depicts a graphical illustration of the number of occurrences and the maximum drawer velocity.

FIG. 6 graphically illustrates the number of occurrences of drawer activations based on the maximum velocity of the travel of the drawer. As is shown, the bulk of the drawer operations happen around 200 mm/s. This further adds support for FIGS. 4 and 5 in that the speed threshold of the system is sufficient.

Generally, without the mitigation techniques in place: 11/15 (73.3%) of users found the flashing to be distracting or annoying; 3/15 (20%) of users where concerned that the perceived flashing may cause epileptic seizures or migraines; 1/15 (6.6%) of users stated they were concerned about sample integrity with flashing lights. Alternatively, with masking active, users were comfortable with the lighting and did not think it would cause any problems. Some of the users (4/15 or 26.6%) further stated that they found the lighting to be a positive feature, because it allowed them to easily see the test tubes while they were closing the drawer.

Thus, by synchronizing the flashing light to natural changes of an object being imaged (e.g., motion of various surfaces), an embodiment may use intrinsic aspects of human perception to mitigate the problem without adding any cost and/or without damaging the analyte being imaged. Accordingly, an embodiment provides significant and distinct advantages in the field of IVD, where the test tube characteristics are determined by the customer and the samples being imaged are photosensitive.

An embodiment therefore presents technical advantages over the current state of the art in that it allows the flash frequency to vary with the rate of change of the target being imaged. This minimizes the computational effort required to analyze the target and can be used in applications where the natural rate of change is below the flicker fusion rate. Additionally, an embodiment may use significantly lower intensity background/masking light, which reduces cost, increases reliability, and minimizes damage to the analytes in the blood samples. A further embodiment may also allow the operator to see the test tubes being imaged. The DVS operates in an area of the system where the operator requires easy manual and visual access. Thus, it would be impractical to enclose the region for imaging.

Accordingly, some embodiments, as described herein include a method for masking the effects of a flash on an operator. Specifically, the system may receive a tray comprising one or more laboratory containers (e.g., a tray of test tubes placed in the drawer system). The system then centers the tray under the image capture device (e.g., using a drawer encoder system). Once the tray is centered, an embodiment may activate a flash device to illuminate the one or more laboratory containers in order to allow for image capture by an image capture device.

In one or more further embodiments, the system may utilize a shielding system (e.g., a cover) to shield the user(s) from some of the illumination created by the flash device. Additional embodiments may also include a reflective surface that reflects some of the illumination of the flash that otherwise would be directed toward the user. An embodiment may also utilize some form of non-reflective coating (e.g., dark matte finish paint) to reduce the potential illumination of the drawer. Some embodiments may use one or more of these techniques.

In additional embodiments, the environment as a whole may be modified to minimize the effect of the high frequency flashing. For example, an automation system may adjust the light level of the local environment during a period where the flash may be regularly illuminated, thus reducing the apparent effect of the bright light. A further embodiment may activate a background light source within the drawer system to further reduce the flash device's perceived intensity.

The methods, systems, and computer program products are described herein with reference to flowchart illustrations and/or block diagrams of methods, apparatuses (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
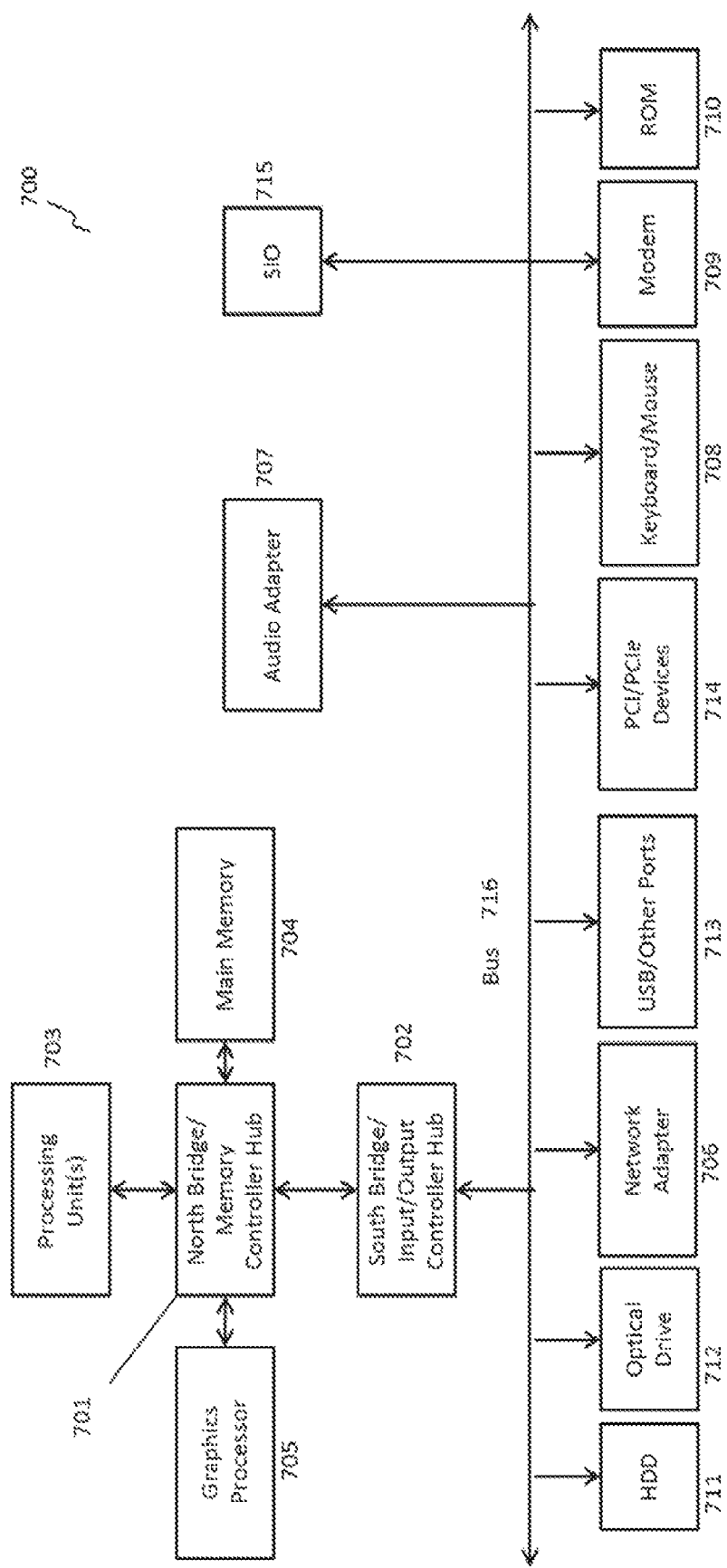
FIG. 7 depicts an illustrative computer system.

FIG. 7 is a block diagram of an example data processing system 700 in which aspects of the illustrative embodiments are implemented. Data processing system 700 is an example of an information handling device, such as a computer, a server or client, in which computer usable code or instructions implementing the process for illustrative embodiments of the present invention are located. In some embodiments, FIG. 7 may represent a server computing device.

In the depicted example, data processing system 700 can employ a hub architecture including a north bridge and memory controller hub (NB/MCH) 701 and south bridge and input/output (I/O) controller hub (SB/ICH) 702. Processing unit 703, main memory 704, and graphics processor 705 can be connected to the NB/MCH 701. Graphics processor 705 can be connected to the NB/MCH 701 through, for example, an accelerated graphics port (AGP).

In the depicted example, a network adapter 706 connects to the SB/ICH 702. An audio adapter 707, keyboard and mouse adapter 708, modem 709, read only memory (ROM) 710, hard disk drive (HDD) 711, optical drive (e.g., CD or DVD) 712, universal serial bus (USB) ports and other communication ports 713, and PCI/PCIe devices 714 may connect to the SB/ICH 702 through bus system 716. PCI/PCIe devices 714 may include Ethernet adapters, add-in cards, and PC cards for notebook computers. ROM 710 may be, for example, a flash basic input/output system (BIOS). The HDD 711 and optical drive 712 can use an integrated drive electronics (IDE) or serial advanced technology attachment (SATA) interface. A super I/O (SIO) device 715 can be connected to the SB/ICH 702.

An operating system can run on processing unit 703. The operating system can coordinate and provide control of various components within the data processing system 700. As a client, the operating system can be a commercially available operating system. An object-oriented programming system, such as the Java™ programming system, may run in conjunction with the operating system and provide calls to the operating system from the object-oriented programs or applications executing on the data processing system 700. As a server, the data processing system 700 can be an IBM® eServer™ System p® running the Advanced Interactive Executive operating system or the Linux operating system. The data processing system 700 can be a symmetric multiprocessor (SMP) system that can include a plurality of processors in the processing unit 703. Alternatively, a single processor system may be employed.

Instructions for the operating system, the object-oriented programming system, and applications or programs are located on storage devices, such as the HDD 711, and are loaded into the main memory 704 for execution by the processing unit 703. The processes for embodiments described herein can be performed by the processing unit 703 using computer usable program code, which can be located in a memory such as, for example, main memory 704, ROM 710, or in one or more peripheral devices.

A bus system 716 can be comprised of one or more busses. The bus system 716 can be implemented using any type of communication fabric or architecture that can provide for a transfer of data between different components or devices attached to the fabric or architecture. A communication unit such as the modem 709 or the network adapter 706 can include one or more devices that can be used to transmit and receive data.

Those of ordinary skill in the art will appreciate that the hardware depicted in FIG. 7 may vary depending on the implementation. Other internal hardware or peripheral devices, such as flash memory, equivalent non-volatile memory, or optical disk drives may be used in addition to or in place of the hardware depicted. Moreover, the data processing system 700 can take the form of any of a number of different data processing systems, including but not limited to, client computing devices, server computing devices, tablet computers, laptop computers, telephone or other communication devices, personal digital assistants, and the like. Essentially, data processing system 700 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention. Additionally, as used herein, the term processor may refer to a micro controller unit (MCU) or system on chip design that can execute code stored in memory.

We claim:

1. A method for masking the effects of a flash on an operator comprising:
   receiving, at a drawer system, a tray configured to hold one or more laboratory containers;
   centering the tray underneath an image capture device;
   activating, based on said centering, a flash device to illuminate the one or more laboratory containers;
   adjusting an environmental light level based on at least one of the receiving, the centering, and the activating;
   mitigating, using a flash masking system, at least one visual effect of the flash device; and
   capturing, using the image capture device, an illuminated image of the one or more laboratory containers.

2. The method of claim 1, wherein the flash masking system further comprises shielding, using a cover, a user from at least a portion of the illumination from the flash device.

3. The method of claim 1, wherein the flash masking system further comprises one or more reflective surfaces that reflect a portion of the illumination from the flash device away from the user.

4. The method of claim 1, wherein the flash masking system further comprises reducing reflective illumination of the drawer system by covering at least a portion of the drawer system in a dark matte finish.

5. The method of claim 1, wherein the flash masking system further comprises illuminating a background light source within the drawer system to reduce the flash device's perceived intensity.

6. The method of claim 1, wherein adjusting the environmental light level comprises increasing the ambient light in a local environment.

7. An information handling device for masking the effects of a flash on an operator comprising:

a processor;

a memory device that stores instructions executable by the processor to:
- receive, at a drawer system, a tray comprising one or more laboratory containers;
- center, using the drawer system, the tray underneath an image capture device;
- activate, based on said centering, a flash device to illuminate the one or more laboratory containers;
- illuminate, using a flash masking system, a background light source, thereby mitigating at least one visual effect of the flash device, wherein the illumination of the background light source has a duration that is at least between 300 times longer and 900 times longer than the flash device; and
- capture, using the image capture device, an illuminated image of the one or more laboratory containers.

8. The information handling device of claim 7, wherein the flash masking system further comprises a cover that shields a user from at least a portion of the illumination from the flash device.

9. The information handling device of claim 7, wherein the flash masking system further comprises one or more reflective surfaces that reflect a portion of the illumination from the flash device away from the user.

10. The information handling device of claim 7, wherein the background light source is within the drawer system to reduce the flash device's perceived intensity.

11. The information handling device of claim 7, wherein adjusting the light level comprises increasing the ambient light in the local environment.

12. A system for masking the effects of a flash on an operator comprising:
- a drawer system configured to receive a tray comprising one or more laboratory containers, wherein upon receiving the tray, the drawer system centers the tray underneath an image capture device;
- a flash device configured to activate, based on said centering, to illuminate the one or more laboratory containers;
- a flash masking system comprising a background light source configured to mitigate at least one visual effect of the flash device, wherein the background light source has a maximum light level of approximately 2.5% the flash device; and
- an image capture device configured to capture an illuminated image of the one or more laboratory containers.

13. The system of claim 12, wherein the flash masking system further comprises a cover that shields a user from at least a portion of the illumination from the flash device.

14. The system of claim 13, wherein the flash masking system further comprises one or more reflective surfaces that reflect a portion of the illumination from the flash device toward away from the user.

15. The system of claim 12, wherein the drawer system further comprises a dark matte finish configured to reduce reflective illumination of the drawer system.

16. The system of claim 12, wherein the flash masking system is further configured to adjust a light level of a local environment.

17. The system of claim 16, wherein adjusting the light level comprises increasing the ambient light in the local environment.

* * * * *